(12) United States Patent
Lazaroff et al.

(10) Patent No.: US 10,295,005 B2
(45) Date of Patent: May 21, 2019

(54) DISC BRAKE ASSEMBLY

(71) Applicant: CONSOLIDATED METCO, INC., Vancouver, WA (US)

(72) Inventors: Spencer Aaron Lazaroff, Corvallis, OR (US); Andrew James Stratton, Vancouver, WA (US)

(73) Assignee: CONSOLIDATED METCO, INC., Vancouver, WA (US)

( * ) Notice: Subject to any disclaimer, the term of this patent is extended or adjusted under 35 U.S.C. 154(b) by 0 days.

(21) Appl. No.: 15/673,969

(22) Filed: Aug. 10, 2017

(65) Prior Publication Data
US 2019/0048951 A1 Feb. 14, 2019

(51) Int. Cl.
*F16D 125/28* (2012.01)
*F16D 65/42* (2006.01)
(Continued)

(52) U.S. Cl.
CPC ........... *F16D 65/42* (2013.01); *F16D 55/227* (2013.01); *F16D 65/18* (2013.01); *F16D 2121/08* (2013.01); *F16D 2125/32* (2013.01)

(58) Field of Classification Search
CPC ........ F16D 65/18; F16D 65/42; F16D 55/227; F16D 55/30; F16D 55/2255; F16D 2121/08; F16D 2125/32; F16D 2125/28
(Continued)

(56) References Cited

U.S. PATENT DOCUMENTS 2,781,106 A    2/1957   Lucien
3,507,367 A    4/1970   Brown et al.
(Continued)

FOREIGN PATENT DOCUMENTS

EP       0688404 A1    1/1997
JP      2008151169 A    7/2008
(Continued)

OTHER PUBLICATIONS

International Search Report and Written Opinion in corresponding International Application No. PCT/US18/45110, dated Oct. 11, 2018, 6 pages.

*Primary Examiner* — Thomas W Irvin
(74) *Attorney, Agent, or Firm* — Amsted Industries Incorporated

(57) ABSTRACT

A disc brake assembly is provided that includes a camshaft extending from a slack adjuster. A disc brake rotor and a brake caliper bridge having an outer plate and an inner plate are provided. A brake caliper carrier is provided with an outer brake pad contained by the brake caliper carrier and an inner brake pad contained by the brake caliper carrier. A cam carrier having two openings is provided along with a pusher plate having a first surface in contact with the cam and a second surface in contact with the inner brake pad. A first and a second slide pin each extend through an opening in the cam carrier and an opening in the pusher plate and an opening in the inner plate of the brake caliper bridge and into the brake caliper carrier. A cam is mounted onto the camshaft such that rotation of the camshaft will rotate the cam, and the brake caliper bridge inner plate having a surface in contact with the cam. The brake caliper bridge outer plate having a surface in contact with the outer brake pad, such that upon rotation of the camshaft and the cam, the pusher plate adjusts the axial position of the inner brake pad and the brake caliper bridge outer plate adjusts the axial position of the outer brake pad, actuating the brake.

16 Claims, 3 Drawing Sheets

(51) Int. Cl.
*F16D 55/227* (2006.01)
*F16D 65/18* (2006.01)
F16D 121/08 (2012.01)
F16D 125/32 (2012.01)

(58) Field of Classification Search
USPC .................................................. 188/72.7
See application file for complete search history.

(56) References Cited

U.S. PATENT DOCUMENTS

| | | | |
|---|---|---|---|
| 3,547,233 A | 12/1970 | Girvan | |
| 3,590,962 A | 7/1971 | Parker et al. | |
| 3,651,897 A * | 3/1972 | Hahn | F16D 55/46 188/72.2 |
| 3,747,711 A | 7/1973 | Burnett | |
| 3,830,343 A | 8/1974 | Gardner | |
| 3,900,084 A * | 8/1975 | Farr | F16D 65/18 188/196 F |
| 3,997,033 A * | 12/1976 | Bulmer | F16D 65/18 188/72.7 |
| 4,022,300 A | 5/1977 | Afanador et al. | |
| 4,036,329 A | 7/1977 | Anderson | |
| 4,064,973 A | 12/1977 | Deem et al. | |
| 4,121,697 A | 10/1978 | Kobelt et al. | |
| 4,154,321 A | 5/1979 | Falk | |
| 4,454,933 A | 6/1984 | Hunnicutt et al. | |
| 5,000,294 A * | 3/1991 | Hunnicutt | F16D 65/18 188/196 D |
| 5,020,643 A | 6/1991 | Redenbarger | |
| 5,343,984 A | 9/1994 | Bieker et al. | |
| 6,135,029 A | 10/2000 | Oberjohn | |
| 6,811,004 B1 | 11/2004 | Mccann et al. | |
| 7,331,432 B2 | 2/2008 | Watada | |
| 7,837,014 B2 * | 11/2010 | Schneider | F16D 55/22 188/18 A |
| 7,913,824 B2 | 3/2011 | Ishida et al. | |
| 8,662,260 B2 * | 3/2014 | Baldeosingh | F16D 65/12 188/72.7 |
| 9,145,120 B2 | 9/2015 | Burgoon et al. | |
| 2007/0246311 A1 | 10/2007 | Schneider | |

FOREIGN PATENT DOCUMENTS

| | | |
|---|---|---|
| JP | 5159697 B2 | 3/2013 |
| WO | 2014189089 A1 | 11/2014 |

* cited by examiner

DISC BRAKE ASSEMBLY

BACKGROUND

The present application is related to disc brake caliper assembly and, more particularly, to an air disc brake assembly by which the clamping force is created by a rotating camshaft. Disc brakes and more particularly air operated disc brakes are gaining use in the heavy truck field. Air disc brakes have many benefits over traditional drum brakes, including increased stopping power and fade resistance. However, the internal actuation and adjustment mechanisms increase complexity and cost.

A camshaft actuated disc brake caliper is known from prior art. However, this three plate, floating design utilizes the torque plate to isolate the sliding caliper components from the braking torque to avoid binding and allows the air can, slack adjuster, and camshaft to be robustly mounted to the axle or torque plate. Previous designs required these actuation components to slide with the caliper, significantly increasing the size and mass of the caliper.

SUMMARY

The present application provides a disc brake caliper by which the clamping force is created by a rotating camshaft.

Similar to a traditional S-cam drum foundation brake, an air chamber is pressurized and provides an axial force to a lever, also known as a slack adjuster. The slack adjuster activates a cam shaft that in turn rotates a cam. The cam acts against a pusher plate and an inner plate of a caliper bridge. The pusher plate actuates an inner brake pad. The caliper bridge actuates an outer brake pad through an outer plate of the caliper bridge. Two slide pins support and allow axial movement of the caliper bridge by extending through holes in the inner plate of the caliper bridge. The two slide pins also support and allow axial movement of the pusher plate by extending through holes in the pusher plate. The two slide pins also support a cam carrier that supports the camshaft by extending through holes in the cam carrier.

BRIEF DESCRIPTION OF THE DRAWINGS

Referring now to the drawings.

DETAILED DESCRIPTION

Figure 1:
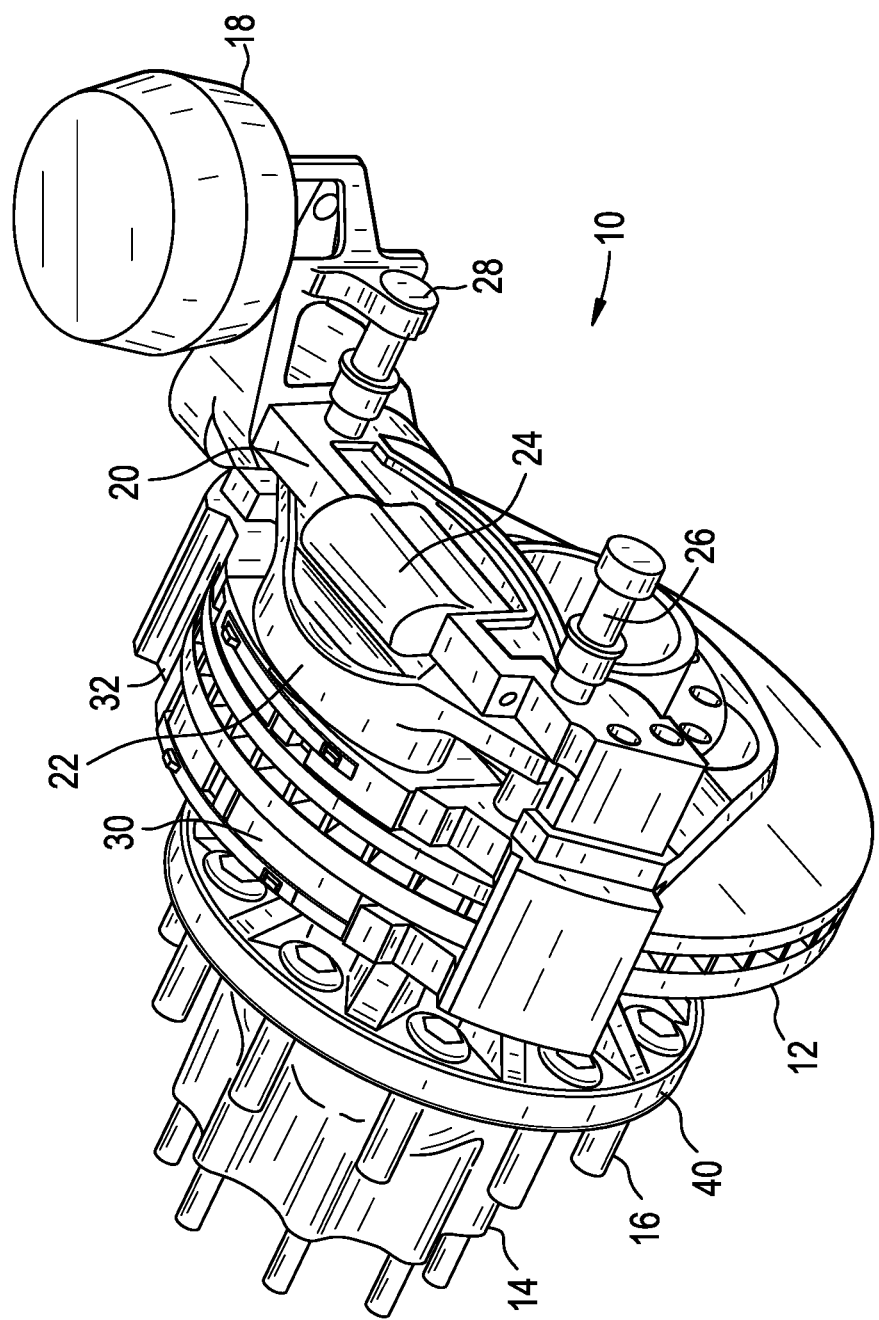
FIG. 1 is a perspective view of a disc brake assembly in accordance with an embodiment of the present invention.
Figure 2:
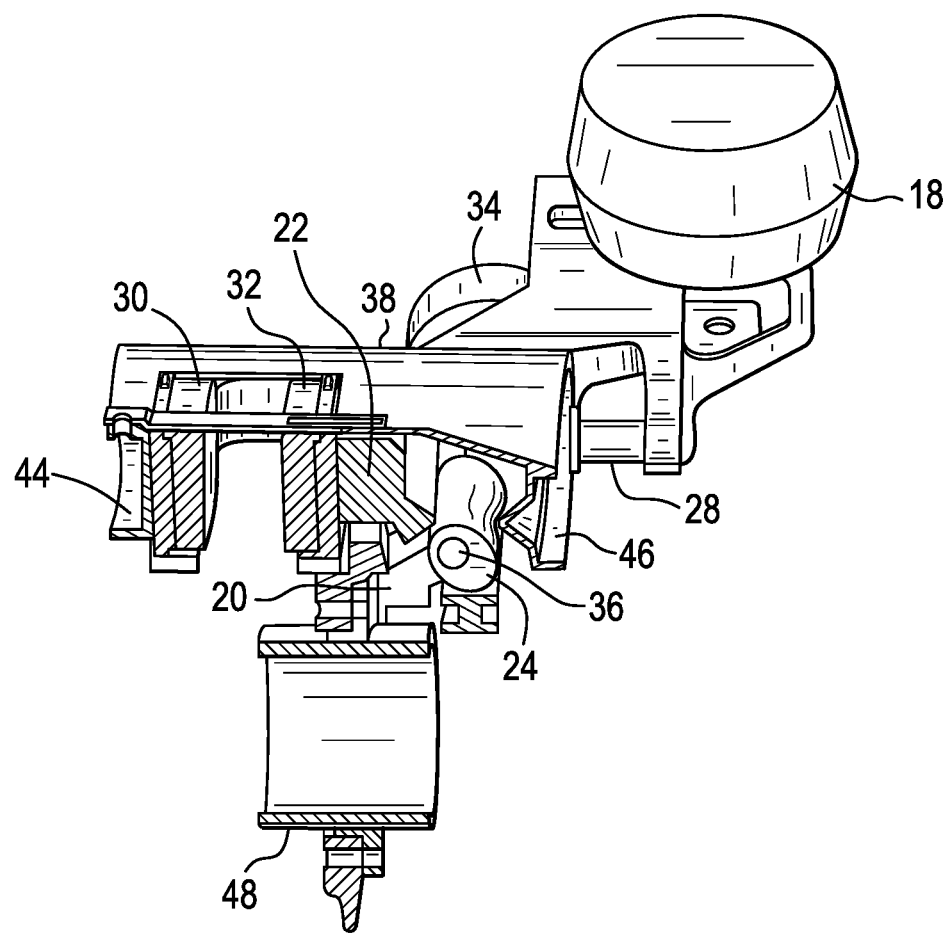
FIG. 2 is perspective view in partial cross section of certain components of a disc brake assembly in accordance with an embodiment of the present invention.
Figure 3:
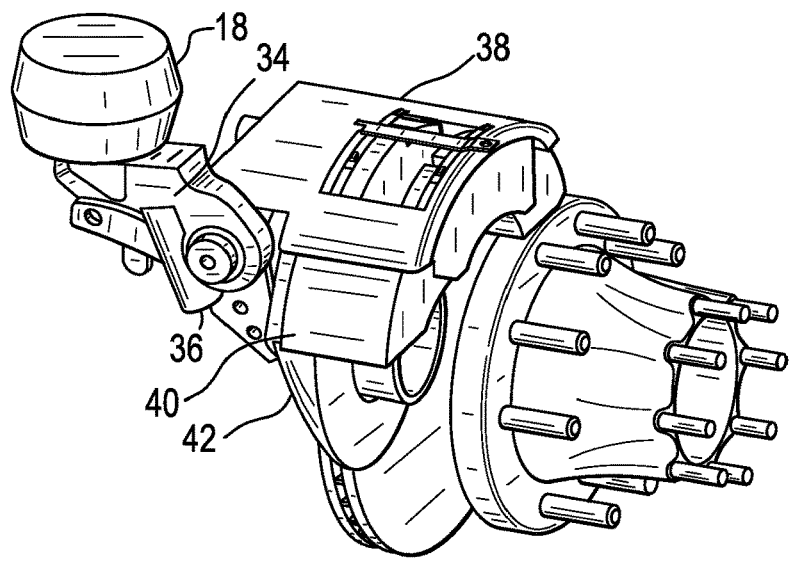
FIG. 3 is a perspective view of certain components of a disc brake assembly in accordance with an embodiment of the present invention.
Figure 4:
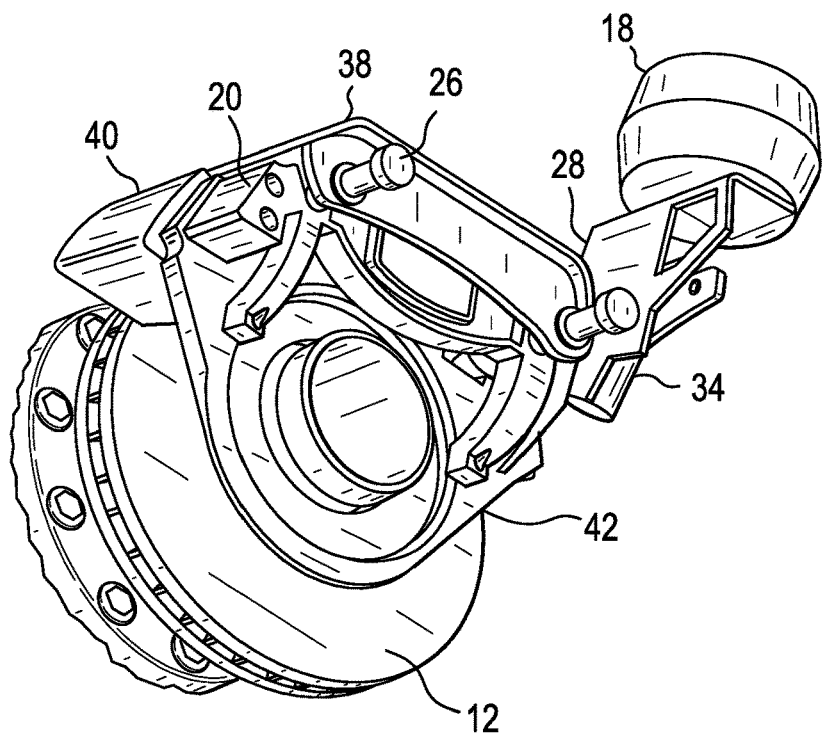
FIG. 4 is a perspective view of certain components of a disc brake assembly in accordance with an embodiment of the present invention.

Referring now to FIGS. 1-4, a disc brake assembly is shown generally at 10. Disc brake rotor 12 includes a radially central opening that receives axle 48. Wheel hub 14 is affixed to disc brake rotor 12 by use of stud bolts. Wheel lugs 16 extend from wheel hub 14 to allow the mounting of a wheel and tire to wheel hub 14. Disc brake rotor 12 is typically comprised of a disc of machined steel. Wheel hub 14 is typically a cast aluminum structure. Air supply chamber 18 provides the necessary activation force to slack adjuster 34 as necessary to provide the clamping force to the disc brake outer brake pad 30 and inner brake pad 32. Activation from slack adjuster 34 is in the form of rotation force on cam shaft 36. Upon rotation of cam shaft 36, cam 24 which is mounted on cam shaft 36 itself rotates. Air supply chamber 18 is typically a steel housing, with slack adjuster 34 being a structural extension from air supply chamber 18. Cam 24 is typically a machined steel component and cam shaft 36 is typically a steel rod or tube.

Brake caliper bridge 38 includes an outer plate 44 and an inner plate 46. Brake caliper carrier 40 houses an outer brake pad 30 and an inner brake pad 32. Camshaft carrier 20 has two openings. Brake caliper bridge 38 is typically comprised of a cast iron or machined steel structure. Brake caliper carrier 40 and cam carrier 20 are typically comprised of a cast iron or machined steel structure.

Pusher plate 22 has a first surface in contact with cam 24 and a second surface in contact with inner brake pad 32. Further, pusher plate 22 includes two openings. Pusher plate 22 is typically comprised of a cast or machined steel structure.

First slide pin 26 extends through one of the openings in camshaft carrier 20 and one of the openings in pusher plate 22 and into the brake caliper carrier 40 wherein first slide pin 26 is secured. First slide pin 26 and second slide pin 28 are typically comprised of a steel rod or tube. Second slide pin 28 extends through one of the openings in cam carrier 20 and one of the openings in pusher plate 22 and into the brake caliper carrier 40 wherein second slide pin 28 is secured.

It is thusly seen that pusher plate 22 and brake caliper bridge 38 slide axially along first slide pin 26 and second slide pin 28.

Brake caliper bridge inner plate 46 has a surface in contact with cam 24. Such surface on brake caliper bridge inner plate 46 surface may comprise a projection that is in contact with cam 24.

Brake caliper bridge outer plate 44 has a surface in contact with outer brake pad 30.

Torque plate 42 is typically a unitary structure with an axially central opening to allow torque plate 42 to be mounted on axle 48. Camshaft carrier 20 is mounted on torque plate 42. This allows the disc brake assembly to be affixed to axle 46 and to pass braking force to disc brake rotor 12 and thusly to wheel hub 14 affixed thereto. Torque plate 42 is typically comprised of a cast or machined steel structure.

Upon rotation of cam shaft 36 and cam 24, pusher plate 22 adjusts the axial position of inner brake pad 32 and brake caliper bridge outer plate 44 adjusts the axial position of outer brake pad 30.

Upon rotation of cam shaft 36 and cam 24, brake caliper bridge inner plate 46 surface in contact with cam 24 is moved axially which causes brake caliper bridge outer plate 44 to move axially an identical amount as brake caliper bridge inner plate 46 and brake caliper bridge outer plate 44 are part of the brake caliper bridge 38 which is typically a unitary structure.

What is claimed is:

1. A disc brake assembly comprising:
   an air supply and a slack adjuster,
   a camshaft extending from the slack adjuster,
   a cam mounted onto the camshaft such that rotation of the camshaft will rotate the cam,
   a brake caliper bridge having an outer plate and an inner plate,
   a brake caliper carrier, an outer brake pad contained by the brake caliper carrier and an inner brake pad contained by the brake caliper carrier, a cam carrier having two openings, a pusher plate having a first surface in contact with the cam and a second surface in contact with the inner brake pad and having two openings, a first slide pin extending through one of the openings in the cam carrier and one of the openings in the pusher plate and into the brake caliper carrier, a second slide pin extending through one of the openings in the cam carrier and one of the openings in the pusher plate and into the brake caliper carrier, the brake caliper bridge inner plate having a surface in contact with the cam, and the brake caliper bridge outer plate having a surface in contact with the outer brake pad, such that upon rotation of the camshaft and the cam, the pusher plate adjusts the axial position of the inner brake pad and the brake caliper bridge outer plate adjusts the axial position of the outer brake pad.

2. The disc brake assembly of claim 1,
further comprising a torque plate,
and wherein the brake caliper carrier and the cam carrier are mounted on the torque plate.

3. The disc brake assembly of claim 2,
wherein the torque plate is mounted onto a vehicle axle.

4. The disc brake assembly of claim 1,
wherein the brake caliper inner plate surface in contact with the cam is comprised of a projection on the inner plate surface.

5. The disc brake assembly of claim 1,
wherein the air supply is comprised of an air pressure chamber.

6. The disc brake assembly of claim 1,
further comprising a wheel hub connected to the disc brake rotor such that braking force is transferred from the disc brake rotor to the wheel hub.

7. The disc brake assembly of claim 1,
wherein the brake caliper bridge inner plate includes a first opening through which the first slide pin passes and a second opening through which the second slide pin passes.

8. The disc brake assembly of claim 1,
wherein upon rotation of the cam shaft and cam, the brake caliper bridge inner plate surface in contact with the cam is moved axially which causes the brake caliper bridge outer plate to move axially.

9. The disc brake assembly of claim 8,
further comprising a torque plate,
and wherein the brake caliper carrier and the cam carrier are mounted on the torque plate.

10. The disc brake assembly of claim 8,
wherein the brake caliper inner plate surface includes a projection in contact with the cam.

11. The disc brake assembly of claim 8,
further comprising an air supply to operate the slack adjuster.

12. The disc brake assembly of claim 8,
further comprising a wheel hub connected to the disc brake rotor such that braking force is transferred from the disc brake rotor to the wheel hub.

13. The disc brake assembly of claim 8,
wherein the brake caliper bridge inner plate includes a first opening through which the first slide pin passes and a second opening through which the second slide pin passes.

14. The disc brake assembly of claim 8,
wherein upon rotation of the cam shaft and cam, the brake caliper bridge inner plate surface in contact with the cam is moved axially which causes the brake caliper bridge outer plate to move axially.

15. A disc brake assembly comprising:
a slack adjuster,
a camshaft extending from the slack adjuster,
a cam mounted onto the camshaft such that rotation of the camshaft will rotate the cam,
a brake caliper bridge having an outer plate and an inner plate,
the brake caliper bridge inner plate having two openings,
a brake caliper carrier,
an outer brake pad contained by the brake caliper carrier and an inner brake pad contained by the brake caliper carrier,
a cam carrier having two openings,
a pusher plate having a first surface in contact with the cam and a second surface in contact with the inner brake pad and having two openings,
a first slide pin extending through one of the openings in the cam carrier and one of the openings in the pusher plate and one of the openings in the inner plate of the brake caliper bridge and into the brake caliper carrier,
a second slide pin extending through one of the openings in the cam carrier and one of the openings in the pusher plate and one of the openings in the inner plate of the brake caliper bridge and into the brake caliper carrier,
the brake caliper bridge inner plate having a surface in contact with the cam,
and the brake caliper bridge outer plate having a surface in contact with the outer brake pad,
such that upon rotation of the camshaft and the cam, the pusher plate adjusts the axial position of the inner brake pad and the brake caliper bridge outer plate adjusts the axial position of the outer brake pad.

16. The disc brake assembly of claim 15,
wherein the torque plate is mounted onto a vehicle axle.

\* \* \* \* \*